(12) United States Patent
Dupuis et al.

(10) Patent No.: US 10,458,474 B2
(45) Date of Patent: *Oct. 29, 2019

(54) BEARING ASSEMBLY FOR STEERING COLUMN

(71) Applicant: Koyo Bearings North America LLC, Westlake, OH (US)

(72) Inventors: Patrick Dupuis, Bourges (FR); Fabrice Lemaitre, Plerin (FR)

(73) Assignee: Koyo Bearings North America LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/953,842

(22) Filed: Apr. 16, 2018

(65) Prior Publication Data

US 2018/0363707 A1 Dec. 20, 2018

Related U.S. Application Data

(63) Continuation of application No. 14/774,821, filed as application No. PCT/US2013/031318 on Mar. 14, 2013, now Pat. No. 9,945,420.

(51) Int. Cl.
*F16C 33/60* (2006.01)
*F16C 33/61* (2006.01)
(Continued)

(52) U.S. Cl.
CPC .............. *F16C 33/61* (2013.01); *B62D 1/16* (2013.01); *F16C 19/166* (2013.01);
(Continued)

(58) Field of Classification Search
CPC ........ F16C 19/166; F16C 33/60; F16C 33/61; F16C 35/06; F16C 2326/24; B62D 1/16
See application file for complete search history.

(56) References Cited

U.S. PATENT DOCUMENTS

| 3,370,333 A | 2/1968 | Gibson |
| 3,480,342 A | 11/1969 | Venable |

(Continued)

FOREIGN PATENT DOCUMENTS

| CN | 1551953 | 12/2004 |
| DE | 2518789 | 11/1975 |

(Continued)

OTHER PUBLICATIONS

Office Action dated Sep. 1, 2016 for Chinese Application No. 201380075792.2.

(Continued)

*Primary Examiner* — Phillip A Johnson
(74) *Attorney, Agent, or Firm* — Nelson Mullins Riley & Scarborough LLP

(57) ABSTRACT

A radial support bearing assembly for use within a steering column assembly having an outer tube and a shaft, including at least one inner ring defining an inner raceway, the inner ring being axially fixed relative to the shaft, at least one outer ring defining an outer raceway, and a plurality of roller elements disposed between the at least one inner ring and the at least one outer ring in rolling contact with the inner raceway and the outer raceway. The inner ring is in direct contact with the shaft and has a circular cross-section as taken in a plane parallel to a longitudinal center axis of the shaft.

16 Claims, 4 Drawing Sheets

(51) Int. Cl.
*B62D 1/16* (2006.01)
*F16C 19/16* (2006.01)
*F16C 35/063* (2006.01)
*F16C 33/58* (2006.01)

(52) U.S. Cl.
CPC ........ *F16C 33/581* (2013.01); *F16C 35/0635* (2013.01); *F16C 2326/24* (2013.01)

(56) References Cited

U.S. PATENT DOCUMENTS

| | | | |
|---|---|---|---|
| 3,492,711 A | 2/1970 | Fraunberg | |
| 4,267,625 A | 5/1981 | Gugel | |
| 4,718,781 A | 1/1988 | Gerard | |
| 4,797,008 A * | 1/1989 | Helbig | F16C 19/166 384/49 |
| 5,413,417 A | 5/1995 | Labedian et al. | |
| 5,839,835 A | 11/1998 | Zernickel et al. | |

FOREIGN PATENT DOCUMENTS

| | | |
|---|---|---|
| DE | 2649035 | 5/1977 |
| DE | 2734712 | 2/1979 |
| DE | 3939279 | 1/1991 |
| DE | 4229199 | 3/1994 |
| DE | 1002008007168 | 8/2009 |
| EP | 05544144 | 8/1993 |
| EP | 0982508 | 7/2004 |
| FR | 1529226 | 6/1968 |
| FR | 2193443 | 2/1974 |
| FR | 2236110 | 1/1975 |
| FR | 2586069 | 2/1987 |
| FR | 2669690 | 5/1992 |
| FR | 2816999 | 5/2002 |
| FR | 2829536 | 3/2003 |
| FR | 2871128 | 12/2005 |
| GB | 1007191 | 10/1965 |
| GB | 2250064 | 5/1992 |
| JP | S5427643 | 3/1979 |
| JP | S563318 | 1/1981 |
| JP | 2000065070 | 3/2000 |
| JP | 2000074052 | 3/2000 |
| JP | 2000304044 | 10/2000 |
| JP | 2003314564 | 11/2003 |
| WO | 02/042655 | 5/2002 |
| WO | 03/023242 | 3/2003 |
| WO | 2006021273 | 3/2006 |
| WO | WO-2010037641 A1 * | 4/2010 |
| WO | 2012/116735 | 9/2012 |
| WO | 2012/155958 | 11/2012 |

OTHER PUBLICATIONS

Office Action for Japanese Patent Application No. 2016-500039 dated Sep. 21, 2016.
Notice of Preliminary Rejection for Korean Patent Application No. 10-2015-7028076 dated Oct. 4, 2016.
International Search Report and Written Opinion dated Nov. 14, 2013 for PCT/US2013/031318.

* cited by examiner

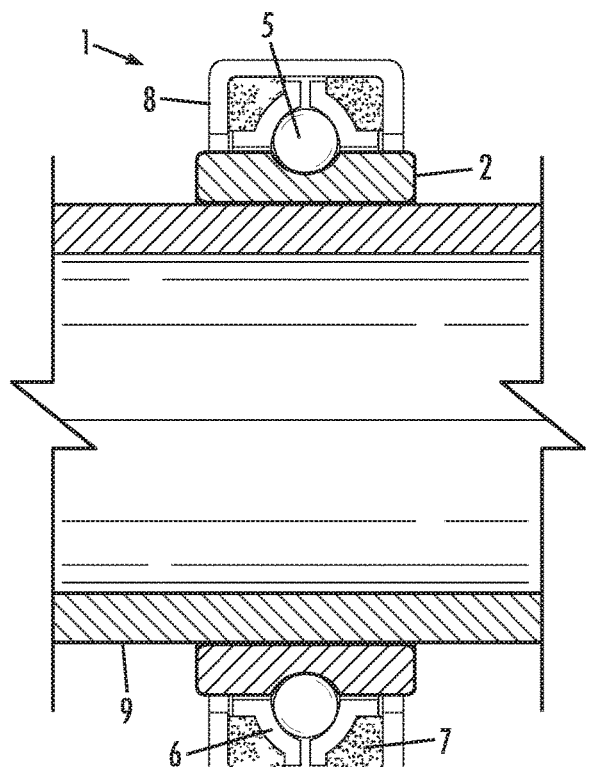
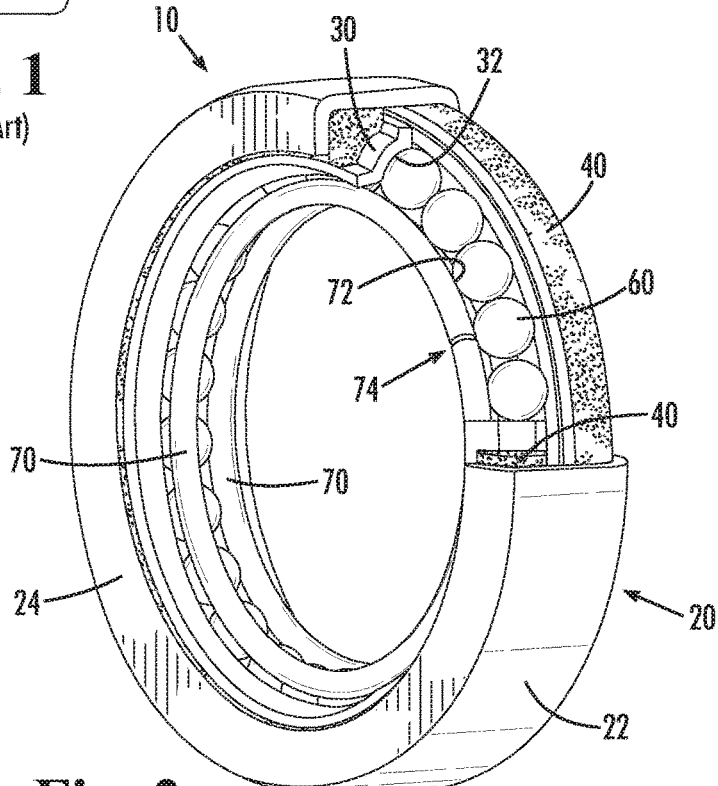
Fig. 1
(Prior Art)
Fig. 2

BEARING ASSEMBLY FOR STEERING COLUMN

CLAIM OF PRIORITY

This is a continuation application of U.S. patent application Ser. No. 14/774,821 filed Sep. 11, 2015, now U.S. Pat. No. 9,945,420, which is a 35 U.S.C. 371 national stage application of PCT/US2013/031318 filed Mar. 14, 2013, the disclosures of which are incorporated by reference herein.

FIELD OF THE INVENTION

The present invention relates generally to support bearings. More particularly, the present invention relates to a radial support bearing assembly for use with a steering column assembly.

BACKGROUND

Bearing assemblies for supporting steering shafts within a steering column assembly are well known. For example, as shown in FIG. 1, the prior art steering column support bearing 1 includes an inner ring 2 defining an inner raceway, a pair of outer rings 6 defining an outer raceway, a retainer ring 8, a pair of preload rings 7 disposed between retainer ring 8 and outer rings 6, and a plurality of roller elements 5 disposed between the inner and outer raceways. When installed in a corresponding steering column assembly, inner ring 2 is assembled on a corresponding steering shaft 9 and a press-fit, whereas retainer ring 8 is positioned within the steering column 2 (not shown) in a press-fit as well. Some manufacturers have found it desirable to increase the outer diameter of the steering shaft while maintaining the outer diameter of the steering tube constant, meaning there is reduced radial space between the steering shaft and steering tube in which to place a radial support bearing. It is known to reduce the thickness of inner ring 2 to reduce the overall thickness of the support beams. However, it is often desirable to superficially heat treat the inner raceway ring to increase the service life of the ring's raceway surface, yet retain a soft core to reduce potentially fracturing the inner ring when being press-fit on a corresponding steering shaft. Reducing the thickness of the inner ring can lead to unintentional hardening of the core and potential damage to the inner ring during assembly.

The present invention recognizes and addresses considerations of prior art constructions and methods.

SUMMARY OF THE INVENTION

In accordance with the present disclosure, one embodiment of a radial support bearing assembly for use within a steering column assembly having an outer tube and a shaft includes at least one inner ring defining an inner raceway, the inner ring being axially fixed relative to the shaft, at least one outer ring defining an outer raceway, and a plurality of roller elements disposed between the at least one inner ring and the at least one outer ring in rolling contact with the inner raceway and the outer raceway. The inner ring is in direct contact with the shaft and has a circular cross-section as taken in a plane parallel to a longitudinal center axis of the shaft.

In accordance with the present disclosure, another embodiment of a radial support bearing assembly for use within a steering column assembly having an outer tube and a shaft includes at least one inner ring defining an inner raceway, the one inner ring being disposed in a first annular groove defined in an outer surface of the shaft, the one outer ring defining an outer raceway, and a plurality of roller elements in rolling contact with the inner raceway defined by the one inner ring and the outer raceway defined by the one outer ring.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which FIG. 1 is a cross-sectional view of a prior art support bearing installed on a steering column;

FIG. 2 is a partial cut-away, perspective view of a radial support bearing assembly for a steering column, in accordance with the present disclosure;

Figure 3:
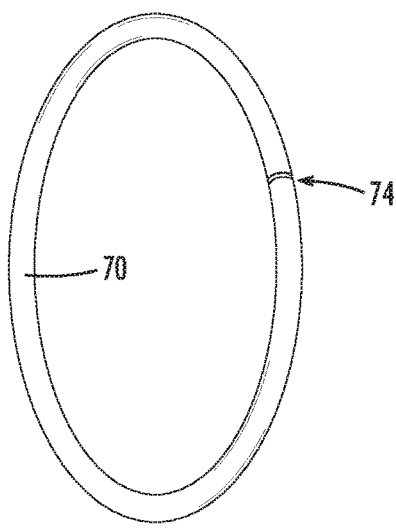
FIG. 3 is a perspective view of an inner race ring of the radial support bearing assembly shown in FIG. 2.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 4:
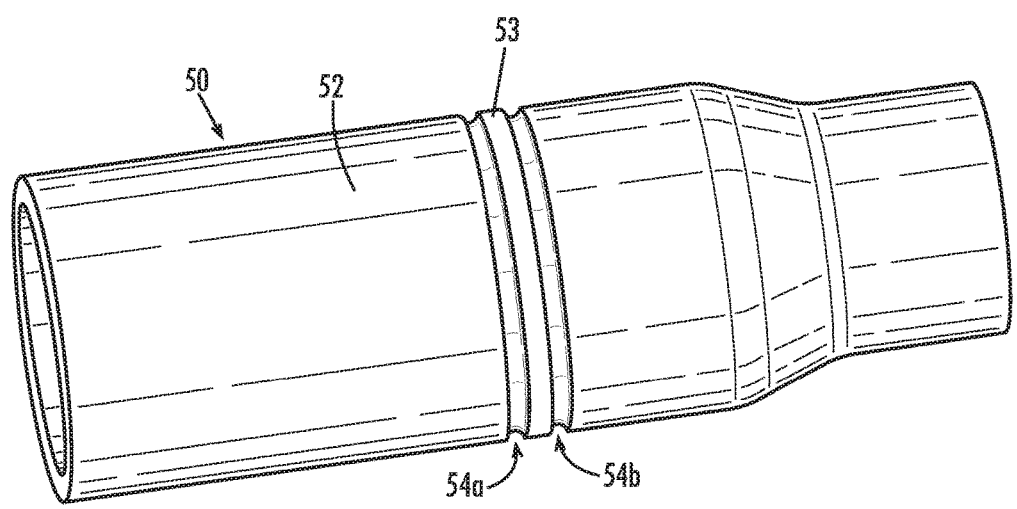
FIG. 4 is a perspective view of a steering column with which the radial support bearing assembly shown in FIG. 2 is used.
Figure 5:
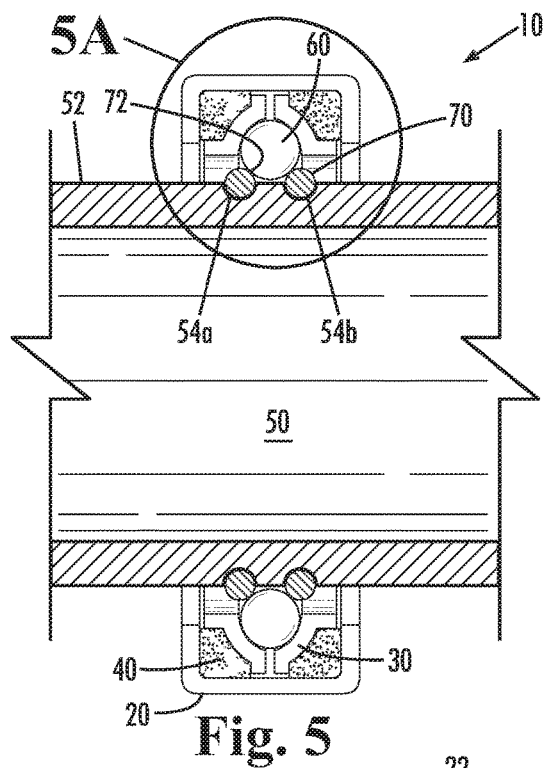
FIG. 5 is a partial cross-sectional view of the radial support bearing assembly shown in FIG. 1, installed on the steering column shown in FIG. 4.

Referring now to the figures, as shown in FIGS. 2 through 5, an embodiment of a steering column support bearing assembly 10 in accordance with the present disclosure includes an outer retainer 20, a pair of outer rings 30 defining an outer raceway 32, a pair of preload rings 40, each preload ring 40 being disposed between a corresponding outer ring 30 and outer retainer 20, a pair of inner rings 70 defining an inner raceway, and a plurality of roller elements 60, more specifically, round roller elements, rotatably received between, and in rolling contact with, outer raceway 32 and inner raceway 72. As shown in FIGS. 4 and 5, the preferred embodiment shown is used in conjunction with a steering column shaft 50 that includes a first annular groove 54a and a second annular groove 54b defined in its outer cylindrical surface that are configured to receive a correspondence inner ring 70 of the support bearing assembly, as discussed in greater detail below. Note, however, in alternate embodiments, annular grooves are not required to axially fix inner rings 70 of the support bearing assembly relative to steering column shaft 50. For example, inner rings 70 may be assembled on to the steering column shaft in a press-fit.

Figure 5A:
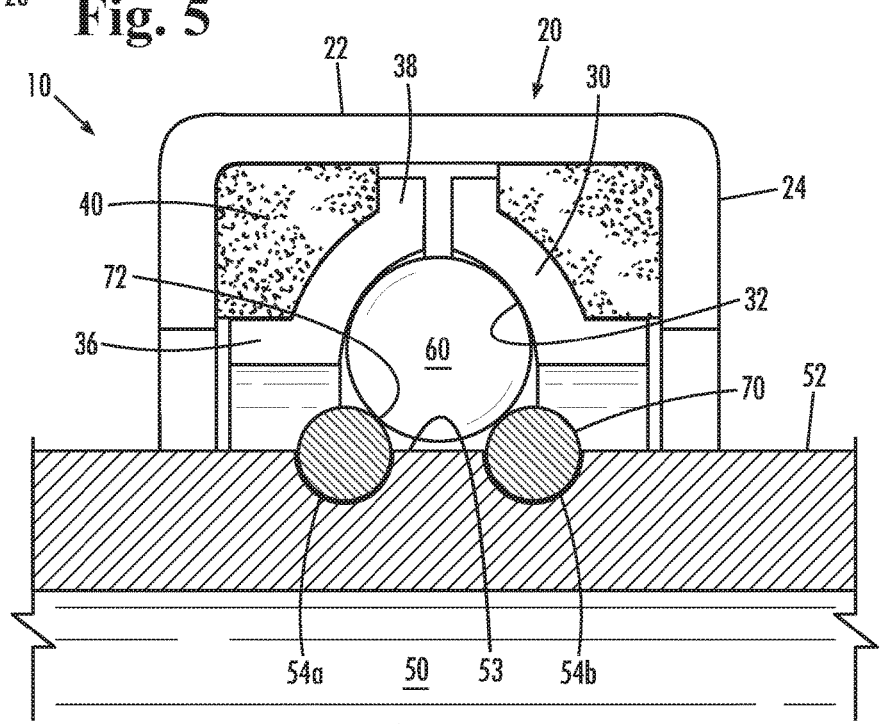
FIG. 5A is an enlarged view of a portion of the radial support bearing assembly shown in FIG. 5.

In the embodiment shown, outer retainer 20 includes a base wall 22 and a pair of flanges 24 depending radially inwardly from the opposed edges of base wall 22. Outer retainer 20 is adapted to be received in the column tube (not shown) of a steering column assembly in a press-fit. As best seen in FIG. 5A, preload rings 40 are each received between a corresponding outer ring 30 and corresponding portion of outer retainer 20. Pre-load rings 40 are constructed of an elastomeric material such as, but not limited to, nitrile butadiene rubber (NBR), and are configured to exert pressure both radially and axially on outer rings 30 and, therefore, round roller elements 60, thereby enhancing smooth operation of the support bearing assembly. Each outer ring 30 includes an axially extending flange 36 and a radially extending flange 38 depending outwardly from a central portion of each outer ring. When assembled, axially extending flanges 36 are concentric with outer surface 52 of steering column shaft 50 and radially extending flanges 38 are parallel to each other. The central portion of each outer ring 30 includes a concave inner surface that defines one half of outer raceway 32.

As best seen in FIG. 3, each inner ring 70 is an o-ring with a split 74 that allows each inner ring 70 to be slid along outer surface 52 of steering column shaft 50 until being received in the corresponding first or second annular groove 54a and 54b. Preferably, the innermost diameter of each inner ring 70 is substantially the same as the diameter of the correspondence annular groove in which it is received. As such, when each inner ring 70 "snaps" into its corresponding annular groove, the inner rings will return to their unbiased dimensions and any gaps present at splits 74 of inner ring 70 will be minimal. Minimizing the dimensions of any gaps formed at splits 74 helps insure inner raceway 72 defined by inner rings 70 is as smooth as possible. As shown, the cross-sectional shape of each annular groove 54a and 54b corresponds to the cross-sectional shape of the portion of inner ring 70 that is received therein, i.e., circular. However, in alternate embodiments, the cross-sectional shapes of the annular grooves and the inner rings need not correspond. For example, cylindrical inner rings having circular cross-sections can be received in annular grooves having square cross-sections, so long as the inner rings are axially fixed with respect to the steering column shaft. As well, alternate embodiments can include o-rings having cross-sectional shapes other than circular, i.e., triangular, square, polygonal, etc.

As best seen in FIG. 5A, first annular groove 54a and second annular groove 54b are separated by an axial distance that is less than the diameter of round roller elements 60. The axial distance between first and second annular grooves 54a and 54b is selected such that each round roller element 60 makes contact with both inner rings 70 but not with the portion of the steering column shaft's outer surface 52 that is disposed between first and second annular grooves 54a and 54b, as indicated by reference numeral 53. Note, the use of two independent inner rings 70, rather than an inner ring 2 (FIG. 1) as is known in prior art bearings, allows the present bearing to have reduced thickness, as well as a reduced overall outside diameter, as compared to known prior art bearings.

Figure 6:
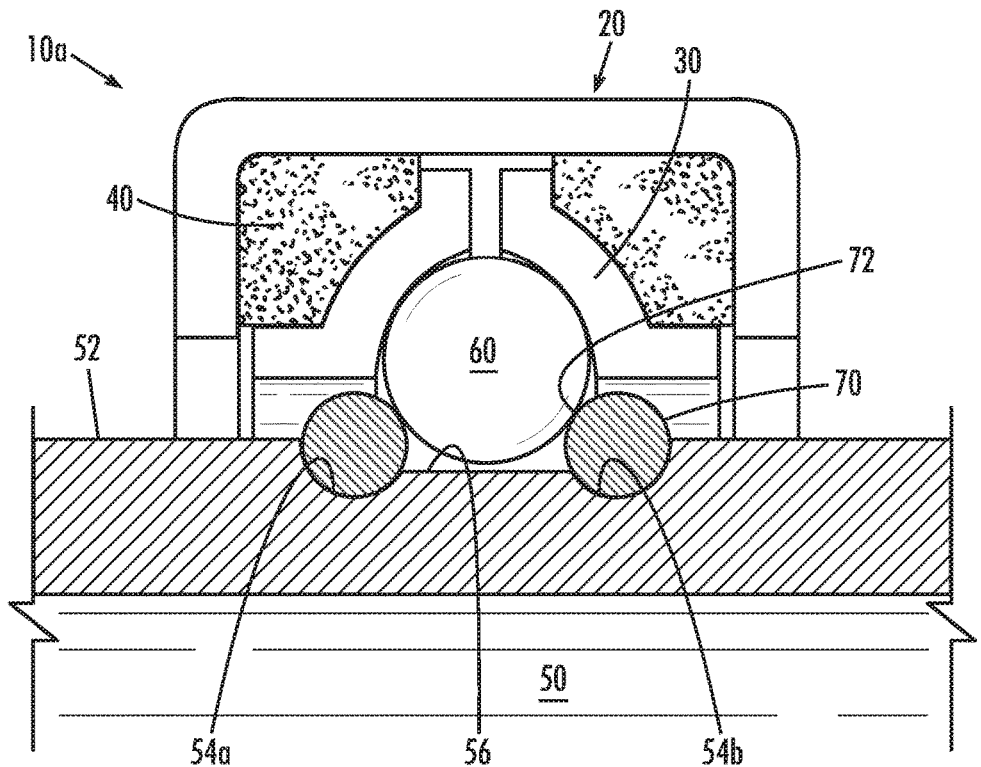
FIG. 6 is a partial cross-sectional view of the support bearing assembly shown in FIG. 1, installed on a steering column similar to the one shown in FIG. 4.

Referring now to FIG. 6, a second embodiment of a steering column support bearing assembly 10a in accordance with the present disclosure is shown. The second embodiment is substantially similar to the first embodiment, with similar elements having the same reference numbers. The second embodiment differs from the previously discussed first embodiment primarily in that a first portion 56 of outer surface 52 of steering column shaft 50 is recessed from the portions of cylindrical outer surface 52 that are axially adjacent the support bearing assembly. Similarly to the first embodiment, first annular groove 54a and second annular groove 54b are separated by an axial distance that is less than the diameter of round roller elements 60. However, the axial distance by which they are separated is greater than the axial distance by which annular grooves 54a and 54b of the first embodiment are separated. As such, the points of contact between inner rings 70 and round roller elements 60 that define outer raceway 72 are farther apart on each round roller element 60, and each round roller element 60 is therefore able to move radially inwardly as compared to its position in the first embodiment in which the inner ring 70 are axially closer. This allows for a further reduction in the maximum outer diameter of the support bearing assembly 10a, as defined by the maximum outer diameter of outer retainer 20 when compared to the first embodiment. Note, first portion 56 of the steering column shaft's outer surface is necessarily recessed in this embodiment to prevent direct contact between round roller elements 60 and steering column shaft 50. This is necessary as the inner diameter between oppositely disposed round roller elements 60 is less than the outer diameter of the steering column shaft's outer surface 52.

Figure 7:
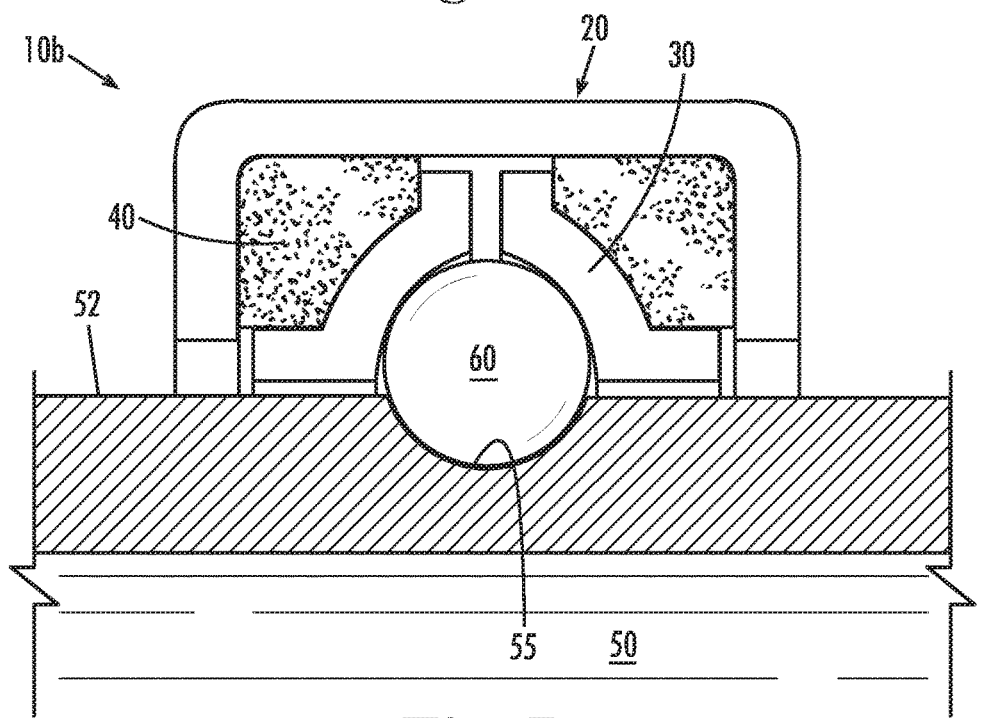
FIG. 7 is a partial cross-sectional view of an alternate embodiment of a support bearing assembly in accordance with the present disclosure.

Referring now to FIG. 7, a third embodiment of a steering column support bearing assembly 10b in accordance with the present disclosure is shown. The third embodiment is substantially similar to the first and second embodiments, with similar elements having the same reference numbers. The third embodiment differs from the previously discussed embodiments in that inner rings 70 have been excluded. Rather, the inner raceway of the support bearing assembly 10b is defined by an annular groove 55 defined by outer surface 52 of steering column shaft 50. In short, round roller elements 60 are in direct rolling contact with steering column shaft 50 rather than separate inner rings, as in the previous embodiments. Note, as the third disclosed embodiment fully omits an inner ring 2 (FIG. 1) as discussed with regard to known prior art bearings, it has a substantially thinner profile and reduced overall outer diameter as compared to those bearings.

While one or more preferred embodiments of the invention are described above, it should be appreciated by those skilled in the art that various modifications and variations can be made in the present invention without departing from the scope and spirit thereof. For example, alternate embodiments may include an inner raceway that is defined by a single o-ring and a shoulder formed on the corresponding steering shaft. It is intended that the present invention cover such modifications and variations as come within the scope and spirit of the appended claims and their equivalents.

What is claimed is:

1. A steering column assembly, comprising:
   a steering column shaft;
   an outer tube disposed around the steering column shaft; and
   a radial support bearing assembly disposed between the outer tube and the steering column shaft, comprising:
      a first annular groove defined in an outer surface of the shaft;
      at least one inner ring defining an inner raceway, the at least one inner ring being disposed in the first annular groove;
      an outer raceway; and
      a plurality of roller elements disposed both between and in rolling contact with the inner raceway and the outer raceway,
      wherein the at least one inner ring is in direct contact with the shaft and has a circular cross-section as taken in a plane parallel to a longitudinal center axis of the shaft.

2. The steering column assembly of claim 1, further comprising at least one outer ring, wherein the at least one outer ring defines the outer raceway.

3. The radial support bearing assembly of claim 2, wherein the at least one outer ring further comprises a first outer ring and a second outer ring, each outer ring having an annular concave surface that defines a portion of the outer raceway.

4. The radial support bearing assembly of claim 1, further comprising a second annular groove defined in the outer surface of the steering column shaft and, a second inner ring disposed in the second annular groove.

5. The radial support bearing assembly of claim 4, wherein the plurality of roller elements further comprises a plurality of round roller elements, and the first inner ring and the second inner ring are separated by an axial distance that is less than a maximum diameter of the round roller elements.

6. The radial support bearing assembly of claim 4, wherein the first inner ring and the second inner ring depend radially outwardly from the outer surface of the shaft.

7. The radial support bearing assembly of claim 4, wherein an innermost portion of each roller element is disposed radially inwardly of an outermost surface of the shaft.

8. The radial support bearing assembly of claim 4, wherein the first inner ring and the second inner ring further comprise split o-rings.

9. The radial support bearing assembly of claim 4, wherein a portion of the shaft's outer surface that is disposed between the first annular groove and the second annular groove is concentric with, and disposed radially inwardly of, an outermost portion of the shaft's outer surface.

10. A steering column assembly, comprising:
    a steering column shaft;
    an outer tube disposed around the steering column shaft; and
    a radial support bearing assembly disposed between the outer tube and the steering column shaft, comprising:
       a first annular groove defined in an outer surface of the shaft;
       at least one inner ring defining an inner raceway, the at least one inner ring being disposed in the first annular groove;
       at least one outer ring defining an outer raceway;
       a plurality of roller elements disposed both between and in rolling contact with the inner raceway and the outer raceway,
       wherein the at least one inner ring is in direct contact with the shaft and has a circular cross-section as taken in a plane parallel to a longitudinal center axis of the shaft; and
       wherein the at least one outer ring further comprises a first outer ring and a second outer ring, each outer ring having an annular concave surface that defines a portion of the outer raceway.

11. The radial support bearing assembly of claim 10, further comprising a second annular groove defined in the outer surface of the steering column shaft and, a second inner ring disposed in the second annular groove.

12. The radial support bearing assembly of claim 11, wherein the plurality of roller elements further comprises a plurality of round roller elements, and the first inner ring and the second inner ring are separated by an axial distance that is less than a maximum diameter of the round roller elements.

13. The radial support bearing assembly of claim 11, wherein the first inner ring and the second inner ring depend radially outwardly from the outer surface of the shaft.

14. The radial support bearing assembly of claim 11, wherein an innermost portion of each roller element is disposed radially inwardly of an outermost surface of the shaft.

15. The radial support bearing assembly of claim 11, wherein the first inner ring and the second inner ring further comprise split o-rings.

16. The radial support bearing assembly of claim 11, wherein a portion of the shaft's outer surface that is disposed between the first annular groove and the second annular groove is concentric with, and disposed radially inwardly of, an outermost portion of the shaft's outer surface.

* * * * *